United States Patent [19]
VonMuenster

[11] Patent Number: 5,902,966
[45] Date of Patent: May 11, 1999

[54] GRAIN DRILL SCALES

[76] Inventor: Ken VonMuenster, 16027 Hwy. 64, Anamosa, Iowa 52205

[21] Appl. No.: 08/918,055

[22] Filed: Aug. 25, 1997

[51] Int. Cl.⁶ ..................................................... G01G 21/02
[52] U.S. Cl. ...................... 177/136; 177/137; 177/DIG. 9
[58] Field of Search ..................................... 177/136, 137, 177/138, 139, 245, DIG. 9, 229, 211

[56] References Cited

U.S. PATENT DOCUMENTS 4,411,325 10/1983 Hamilton ................................. 177/136
5,199,518 4/1993 Woodle .................................... 177/211

*Primary Examiner*—Vit Miska
*Assistant Examiner*—Randy W. Gibson
*Attorney, Agent, or Firm*—James C. Nemmers

[57] ABSTRACT

A grain drill add-on consists of load cells that suspend a grain drill's seed tank or hopper above the body of the grain drill. By adding mounting brackets that connect the load cells to the hopper and to the body of the grain drill, and by connecting the load cells to a digital readout visible to the operator, the downward weight of the hopper will cause deflections in the load cells which are translated into measurable weights displayed to the operator.

1 Claim, 1 Drawing Sheet

GRAIN DRILL SCALES

BACKGROUND OF THE INVENTION

This invention relates to a mounted grain drill scale that allows accurate and constant measurement of seed loads.

Weigh scales utilizing load cells with strain gauges are commonly used in various applications in the prior art. For example, in the agricultural industry, scales are typically used to obtain the measurement of grain loads. These scales may consist of either stationary or portable units designed to support the weight of a vehicle so that the vehicle can be weighed empty and then loaded to measure the load. Typical devices of the prior art are shown in U.S. Pat. Nos. 4,714,121 and 5,440,078. The load cells of these devices transmit the downward weight of the entire vehicle and its load to the readout system. If stationary, it is of course necessary that the load be transported to the scale. If portable, it is necessary that the load and scale be transported to and used upon a solid foundation.

Among the shortcomings of the stationary scales is their limited application as they necessarily demand that the load be transported to the scale. In addition to the added time and expense associated with transport to a stationary scale, the stationary scale may not be available after hours. Portable scales, too, are of limited use as the portable scale must be placed on a solid foundation and cannot provide continuous measurements of a dynamic load.

As is well known to those skilled in the art, grain drills have been known and used for many years to plant soybeans and other crops. Grain drills common in the prior art require that the operator set a seed population or planting density. Setting the population correctly requires measurement of the load as seeds are planted. Among the shortcomings of these grain drills is that they typically require that the operator exit the tractor and climb onto the grain drill to inspect the level of grain in the tank or hopper. This exposes the operator to chemicals applied prior to planting and to increased risk of injury due to slipping or falling off of the equipment. Current scales available for weighing the grain drill and its load require that the operator leave the field in order to bring the drill to the scale. This requirement may pose working hour limitations on a planter if the available scale is commercial and not available after-hours. Moreover, this limits the operator's available planting time. These excursions from the tractor cab and from the field, and limitations on working hours, decrease efficiency by increasing the time required for planting. Neither the stationary nor portable type of scales common in the prior art allow measurement of a load while the load is in motion, and neither allows constant measurement as the load decreases due to planting.

Accurate measurement of population is important in drill planting since planting at a slight percentage over the desired population may result in dramatically increased costs per acre, lead to plant lodging, and make plants more susceptible to disease. Planting below the target population may also lead to added expense and crop damage as yields are lowered and more weeds may emerge through the crop canopy. Accurate measurement of the grain drill's load is therefore vital to efficient planting.

There is therefore a need for an improved way of continuously monitoring the amount of seed remaining in the seed bin of a grain drill or planter at all times. It is therefore the principal object of this invention to provide a mounted scale utilizing load cells that allows accurate measurement of static or dynamic loads while the implement upon which the load and scale are carried is stationary or in motion.

A further object of this invention is to provide a mounted scale utilizing load cells that is easily installed onto grain drills, that reduces the need for the operator to exit the tractor, and that allows convenient and accurate setting of the seed population through constant measurement of remaining grain.

A still further object of this invention is to provide a cab-mounted display, visible in the dark, thus allowing after hours planting when commercial, stationary scales are closed.

These and other objects will be apparent to those skilled in the art from the description of the invention set forth hereinafter.

SUMMARY OF THE INVENTION

A grain drill add-on, this invention consists of load cells that suspend a grain drill's seed tank or "hopper" above the body of the grain drill, mounting brackets that connect the load cells to the hopper and to the body of the grain drill, and a digital readout connected to the load cells. In this fashion the grain hopper is suspended above the body of the grain drill by the load cells, and the downward weight of the hopper causes deflections in the load cells which are translated by strain gauges into measurable weights displayed to the operator.

DESCRIPTION OF THE PREFERRED EMBODIMENT OF THE INVENTION

Figure 1:
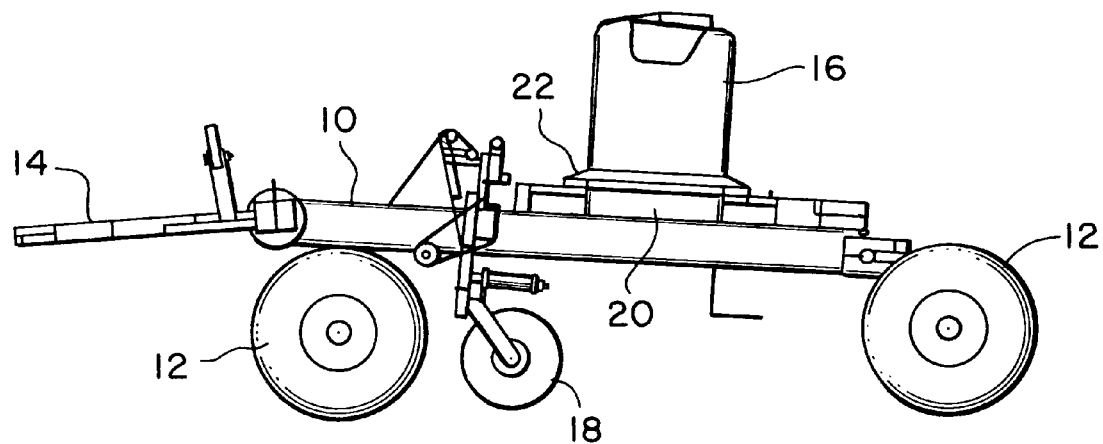
FIG. 1 is a schematic side elevational view of a typical grain drill of the type to which the invention relates.
Figure 2:
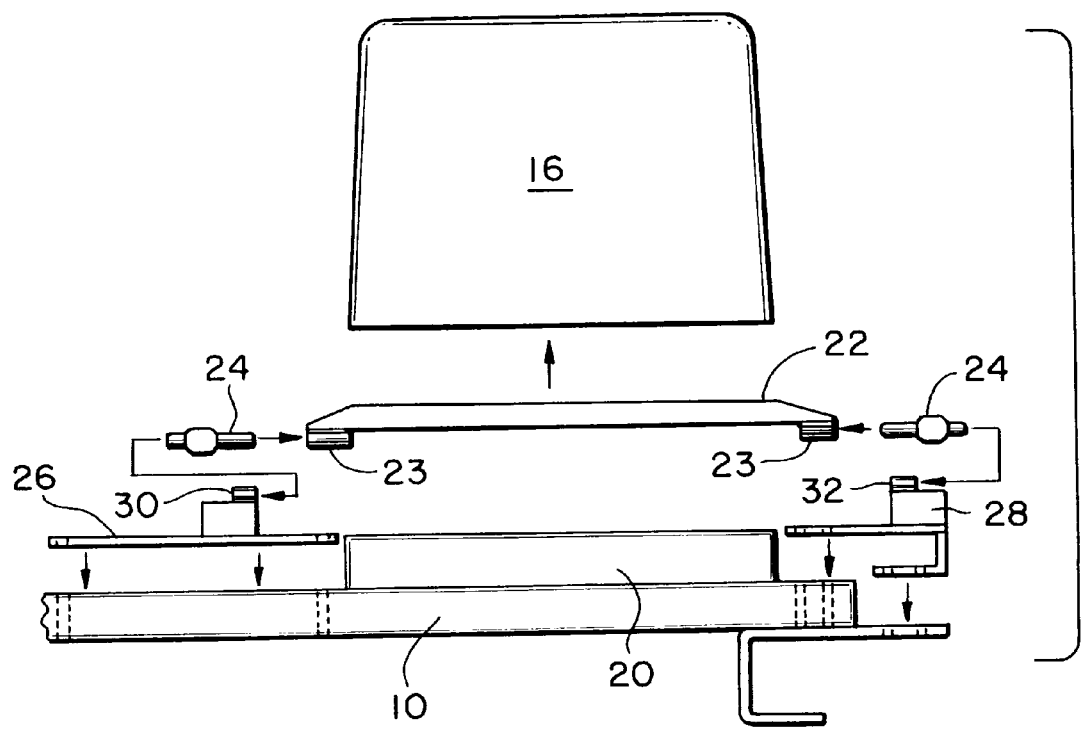
FIG. 2 is an exploded side elevational view of a portion of the grain drill illustrating the invention.

FIG. 1 shows schematically a typical grain drill having a frame 10 mounted on ground engaging wheels 12 and having a tow bar 14 for attachment of the drill to a tractor (not shown). The drill includes a tank or hopper 16 containing the seeds to be planted. As is well known to those skilled in the art, the seeds in the hopper 16 are metered through tubes that drop the seeds into furrows opened in the ground by disks 18 and the furrows are then closed by closing wheels. In the conventional drill, the hopper is affixed to frame members 20 that extend horizontally from front to rear of the drill.

Using the construction of the invention, two middle brackets 22 are secured to the hopper 16, one on each side of the hopper 16, with the brackets 22 running lengthwise along the outside edges of the base of the hopper 16. There is a mounting socket 23 secured at each outer end of each of the middle brackets 22, and four load cells 24 are operatively connected to the brackets 22, the load cells being positioned horizontally with one end of each load cell 24 inserted in one of the sockets 23. To secure the load cells 24 to the frame 10, a front bracket 26 and a rear bracket 28 are mounted on the frame 10 beneath the hopper 16, and each of the brackets 26 and 28 has a socket 30 and 32, respectively, to receive the opposite ends of the load cells 24. The front and rear brackets 26 and 28 support the load cells 24 in place slightly above the frame 10 of the grain drill and thus suspend the hopper 16 about one inch above the frame 10. As is well known to those skilled in the art, the load cells 24 contain strain gauges that translate applied force into voltage variations that are then transmitted to a digital indicator (not shown) that can be mounted on the grain drill or in the operator's cab of the tractor towing the drill. The digital readout system is powered by the 12-volt tractor power system. The digital indicator translates the voltage variations into weights and display the weights on a screen that preferably is lighted, allowing use after dark.

Each load cell 24 has a capacity of 2,500 lbs. for a total capacity of 10,000 lbs. To calibrate the grain drill, the operator should plant about 3–4 acres of the field and then compare the reading on the digital readout with the acre counter that is commonly provided as standard equipment on most grain drills. The operator then adjusts the seed meter to obtain the desired feed rate. For example, if the acre counter shows that 4.11 acres were planted during the calibration run, and the digital readout shows that 375 lbs of seed were used, then 91.24 lbs. of seed per acre were planted. If the desire rate is 85 lbs. per acre, the seed meter is adjusted down 6 lbs. This prevents over or under planting. With over planting, plant lodging and disease problems result, and with under planting, more weeds emerge and there is more chance for erosion problems. Moreover, once properly calibrated, the invention allows the operator to drill more acres per hour by eliminating the time spent stopping and checking the lever of the seed in the grain hopper. This results in substantial savings to the farmer. Moreover, in no-till drilling, the operator has less contact with the chemicals applied on the field prior to planting lessening the chance of any adverse effects from such contact.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A grain drill scale for use for a grain drill having a frame mounted on ground engaging wheels and a seed tank supported on the frame and having a front end and a back end joined by two sides at the corners, said scale comprising: a longitudinally extending first mounting bracket adapted to be secured to the seed tank so as to extend continuously from the front end to the back end of the tank beneath each of the two sides of the tank; a second mounting bracket adapted to be secured to the frame supporting the seed tank beneath each of the corners of the tank and positioned on the frame so as to be positioned outwardly from the sides and ends of the tank; a plurality of load cells that suspend the seed tank above the frame, one load cell being connected between each of the second mounting brackets and one end of the corresponding first mounting bracket, each load cell being mounted so as to extend horizontally from the second mounting bracket into the end of the corresponding first mounting bracket so that the entire weight of the seed tank is supported on the frame through the load cells; and a visual readout device operatively connected to the load cells so that the weight of the seed tank causing deflections in the load cells will be translated into measurable weights continuously displayed on the readout.

\* \* \* \* \*